United States Patent

Halkyard et al.

[15] 3,693,168

[45] Sept. 19, 1972

[54] MACHINE FOR PRODUCING SQUARED-OFF PLOTS FOR USE IN PROGRAMMING KNITTING AND OTHER TEXTILE MACHINES

[72] Inventors: Harold Lees Halkyard, Bushby; Herbert Brian Bliss-Hill, Evington; Eric William Tewsley, Kirby Muxloe, all of England

[73] Assignee: Stibbe Machinery Limited, Leicester, England

[22] Filed: Nov. 2, 1970

[21] Appl. No.: 86,081

[30] Foreign Application Priority Data

Nov. 8, 1969 Great Britain ........54785/69

[52] U.S. Cl.................................340/172.5, 235/151

[51] Int. Cl...................................................G06f 3/00

[58] Field of Search......340/172.5; 235/150, 151, 92

[56] References Cited

UNITED STATES PATENTS

| | | | |
|---|---|---|---|
| 3,391,392 | 7/1968 | Doyle | 340/172.5 |
| 3,596,068 | 7/1971 | Doyle | 235/150 |
| 3,342,979 | 9/1967 | Wright et al. | 235/92 |
| 3,422,419 | 1/1969 | Mathews et al. | 340/172.5 X |
| 3,519,997 | 7/1970 | Bernhart et al. | 340/172.5 |
| 3,559,179 | 1/1971 | Rhoades | 340/172.5 |
| 3,581,281 | 5/1971 | Martin et al. | 340/172.5 X |
| 3,582,898 | 6/1971 | Lemay | 340/172.5 |
| 3,601,590 | 8/1971 | Norton | 340/172.5 X |
| 3,602,902 | 8/1971 | Madden | 340/172.5 |

*Primary Examiner*—Paul J. Henon
*Assistant Examiner*—Ronald F. Chapuran
*Attorney*—Larson, Taylor and Hinds

[57] ABSTRACT

Machine producing squared-off plots has an incremental scanner to scan an artist's picture of a design and to produce signals appropriate to each point scanned, an incremental plotter, and a program controller to program movements of scanner and plotter. Plotter has pens each for marking on a plot a bit of information appropriate to one of the signals. The scanner incorporates tone or color differentiating means. The program controller includes sequence timing means to move scanner at predetermined intervals of time; control means for controlling movements of plotter; means for selecting a pen corresponding to a point scanned by the scanner thereby to position the pen in the appropriate position relatively to plot; and feed back means to halt scanner while a pen is being selected and operated.

15 Claims, 15 Drawing Figures

Figure 1:
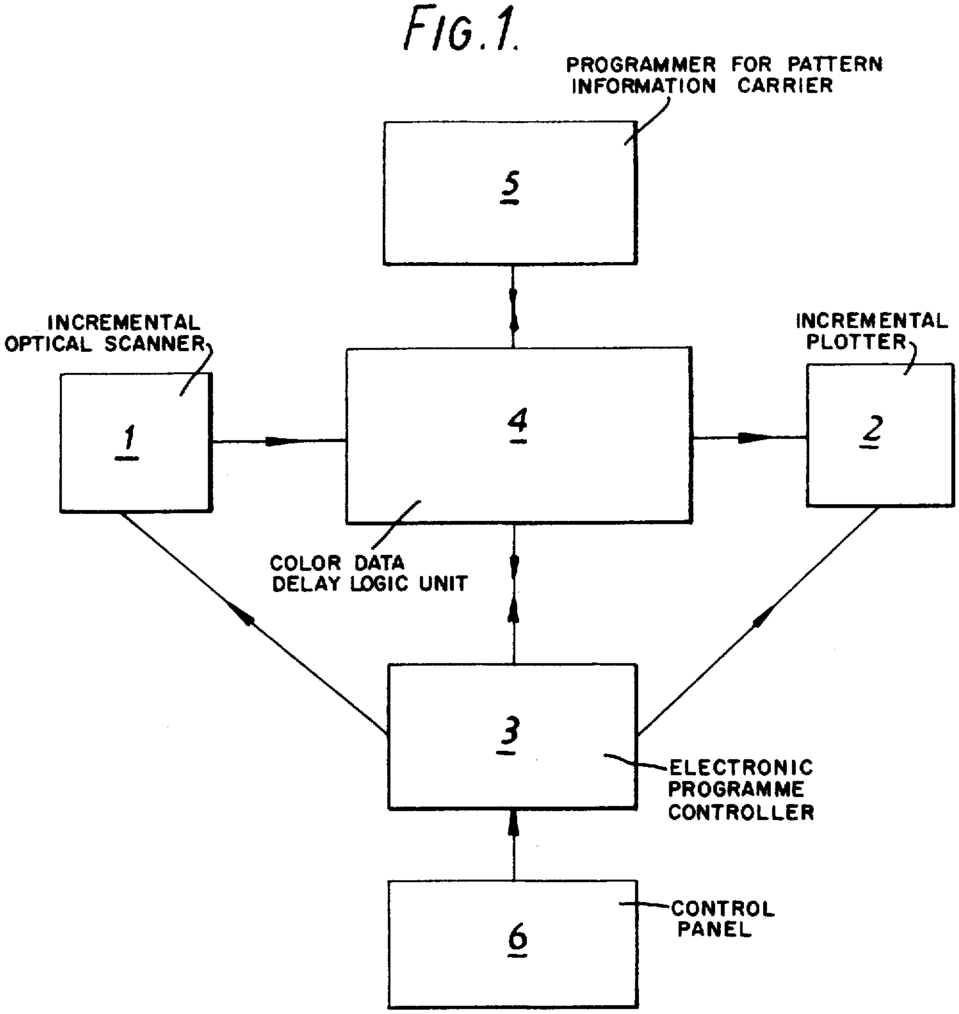

MACHINE FOR PRODUCING SQUARED-OFF PLOTS FOR USE IN PROGRAMMING KNITTING AND OTHER TEXTILE MACHINES

This invention appertains to a machine or apparatus for producing squared-off plots for use in programming knitting and other textile machines.

In the textile industries it is frequently necessary to convert either a simple two-tone or a multi-color pattern, initially drawn by an artist, into coded information in the form of a squared-off plot. The usual method heretofore adopted of so converting an artist's impression or picture of the desired pattern is the extremely tedious, time-consuming and expensive manual method of overlaying the said artist's impression or picture with a grid of squares and then sequentially coding by hand the contents of each square defined by the grid to build up a sequence of data bits representing the overall pattern area. It will be appreciated that such a manual method is particularly time consuming and expensive in cases where desired high resolution dictates the necessity for large plot sizes.

The initially produced artist's impression or picture is drawn in a combination of colors and, so far as the patterning of knitted fabric is concerned, represents a fabric area equivalent to the number of individually operable needles of pattern width and the number of courses of pattern depth of the intended pattern. As regards the patterning of woven cloth, on the other hand, the artist's impression or picture represents an area equivalent to the number of weft lines and the number of warps involved in the intended pattern.

Thus, a squared-off plot is a piece of paper or other equivalent relatively thin and flexible material upon which is printed a grid of, say, 1 mm squares and which is so plotted that the squares are either left blank or marked with a bit of coded information, e.g., in the actual color or tone concerned, as to produce a sequence of data bits constituting the necessary master from which can be produced (either simultaneously or subsequently as will be hereinafter described) a pattern information carrier such, for example, as a punched tape or a magnetic tape for use on a knitting machine or a weaving loom. Accordingly, in producing such a plot, the position and tone or color of each and every square of the grid overlaying the artist's impression or picture has to be recognized, and in regard to a square occupied by more than one tone or color the plotter has to decide which tone or color predominates so that that square can be appropriately left blank or marked to display a relevant data bit: it is these decisions which result in "squaring-off" at the marginal edges of a pattern adjoining un-patterned fabric or at the division between one color and another within the pattern.

The object of the present invention is to provide an efficient machine or apparatus capable of automatically producing a squared-off plot from an artist's impression or picture of a desired pattern, thereby obviating the serious disadvantages of a manual plotting process and at the same time providing means for editing without the necessity to produce actual fabric for proving purposes.

Broadly considered, the machine or apparatus constituting this invention comprises, in combination, an incremental scanner incorporating tone or color differentiating means and operable to successively scan points of an artist's impression or picture of a desired pattern and to produce a signal appropriate to each of the said points, an incremental plotter furnished with a plurality of selectively operable marking devices each for marking a bit of information appropriate to one of each signals, and a program controller which is connected both to the scanner and to the plotter and is constructed and operable to control movements of the scanner and the plotter in such a way that successively scanned points of an artist's impression or picture are plotted by selected marking devices as bits on the plot corresponding to the aforesaid scanned points.

It is to be clearly understood that whilst the individual points of the artist's impression or picture scanned by the tone or color differentiating means of the scanner may be of the same size areawise as the corresponding portions of the plot, this is by no means necessarily so. Thus, the machine may be designed to increase or decrease the scale of the plot areas with respect to the scanned points.

In any event, with the machine of this invention in use, the output from the tone or color differentiating means in the scanner is used to control the plotter so that simultaneously with the scanning of an artist's impression or picture of the desired pattern a squared-off plot of the latter will be automatically produced.

If, as will usually be the case, the selectively operable marking devices of the plotter are separately mounted serially with their axes spaced apart at relatively fixed locations on traversible carriage means, then the latter require to be traversed to positions in which selected marking devices can mark relevant portions of the plot. In such a case, the machine or apparatus of the invention essentially includes an electronic store, arranged between the tone or color differentiating means and the aforesaid carriage means, to receive and store information passed to it by said differentiating means so that such information can be used for plotting with the appropriate marking devices at the relevant times. The selectively operable marking devices may conveniently be shiftable axially relatively to the carriage, at the dictates of the electronic store, to enable them to mark paper or the like carried in the plotter.

But if, as may be, the marking devices are coaxially arranged at one location, then the electronic store could be dispensed with.

The machine may advantageously be provided with manual override means actuation of which permit editing of a squared-off plot to be carried out in a case where an artist requires a different interpretation to an edge of a pattern from that decided by the machine when functioning automatically.

Preferably, the tone or color differentiating means arranged on the scanner to successively scan points of an artist's impression or picture of a desired pattern consists of fiber-optic light guides of the form embodied in the optical scanning apparatus in the Provisional Specification of The Rank organization Limited's United Kingdom Patent Application No. 45466/69 filed on Sept. 15, 1969. Such fiber-optic light guides comprise light-transmitting fibers and are themselves now well known and commercially available. Thus, in a preferred embodiment of the invention, the scanner head carries a flexible illuminating light guide through which light is directedon to the scanned points successively and at least one flexible sampling light guide adapted to sample light reflected from the illuminated points and to transmit the same to light-responsive means by which signals (constituting coded information) representative of the scanned artist's impression or picture are produced.

Figure 2A:
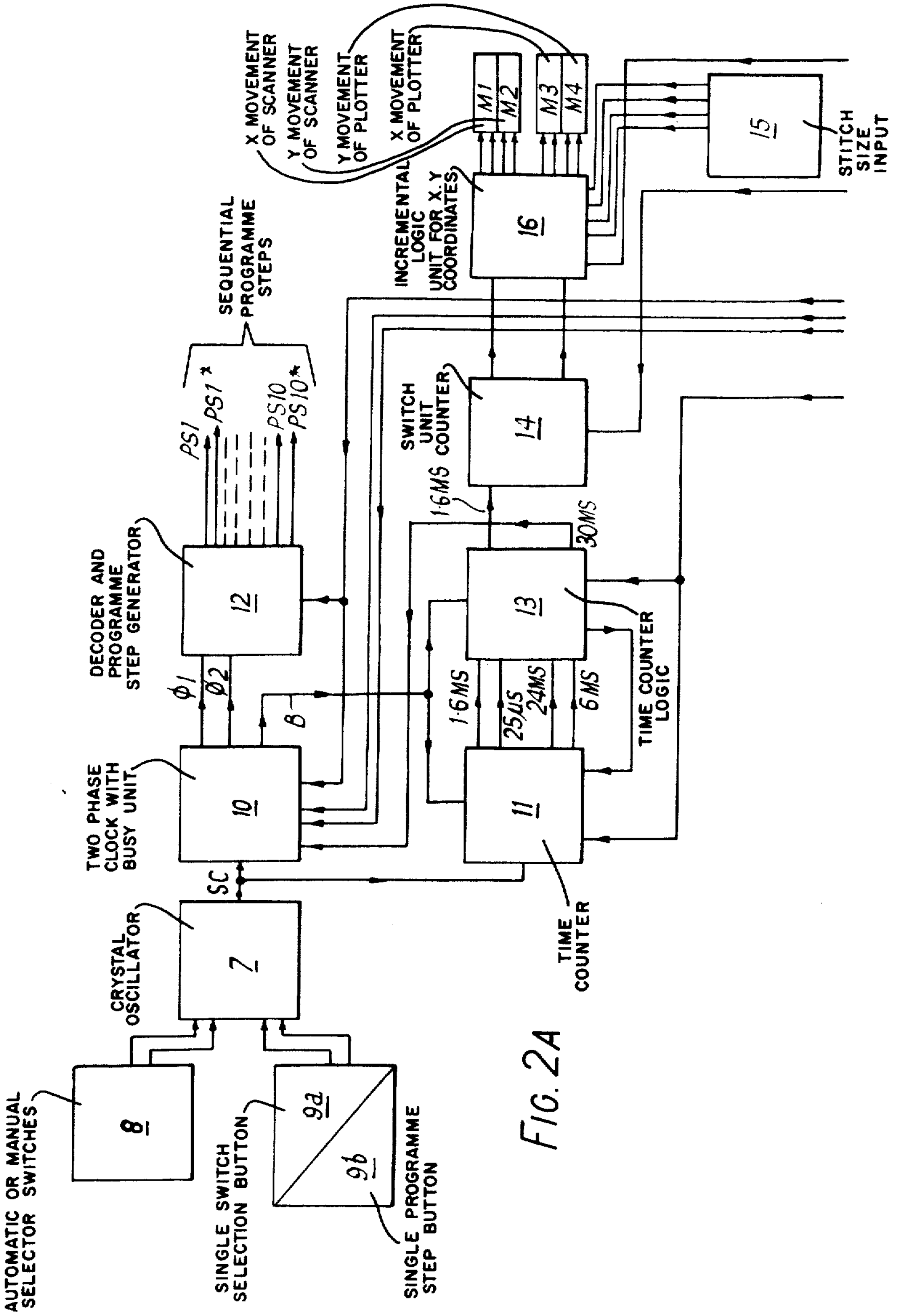
Figure 2B:
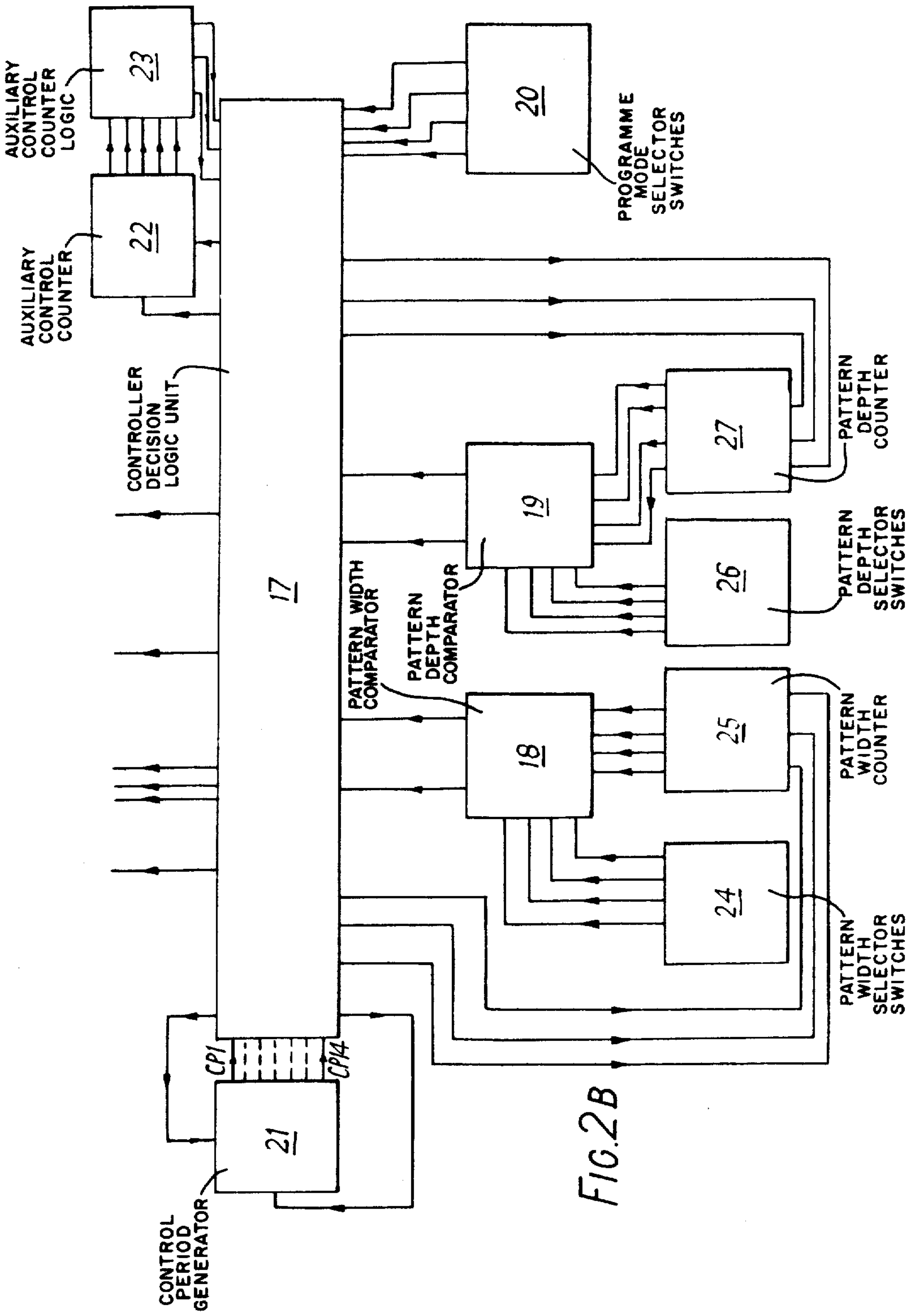
Figure 3:
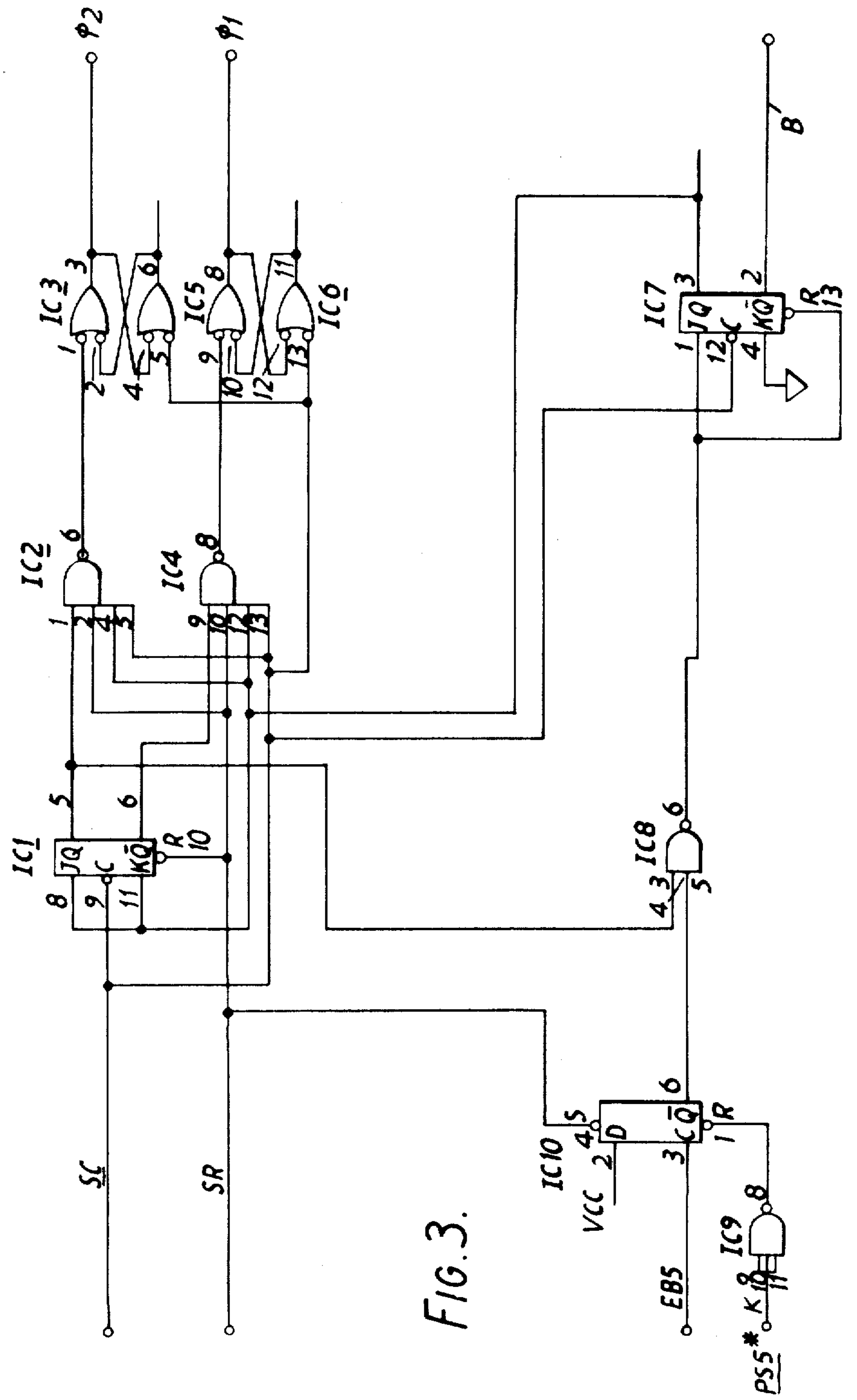
Figure 4:
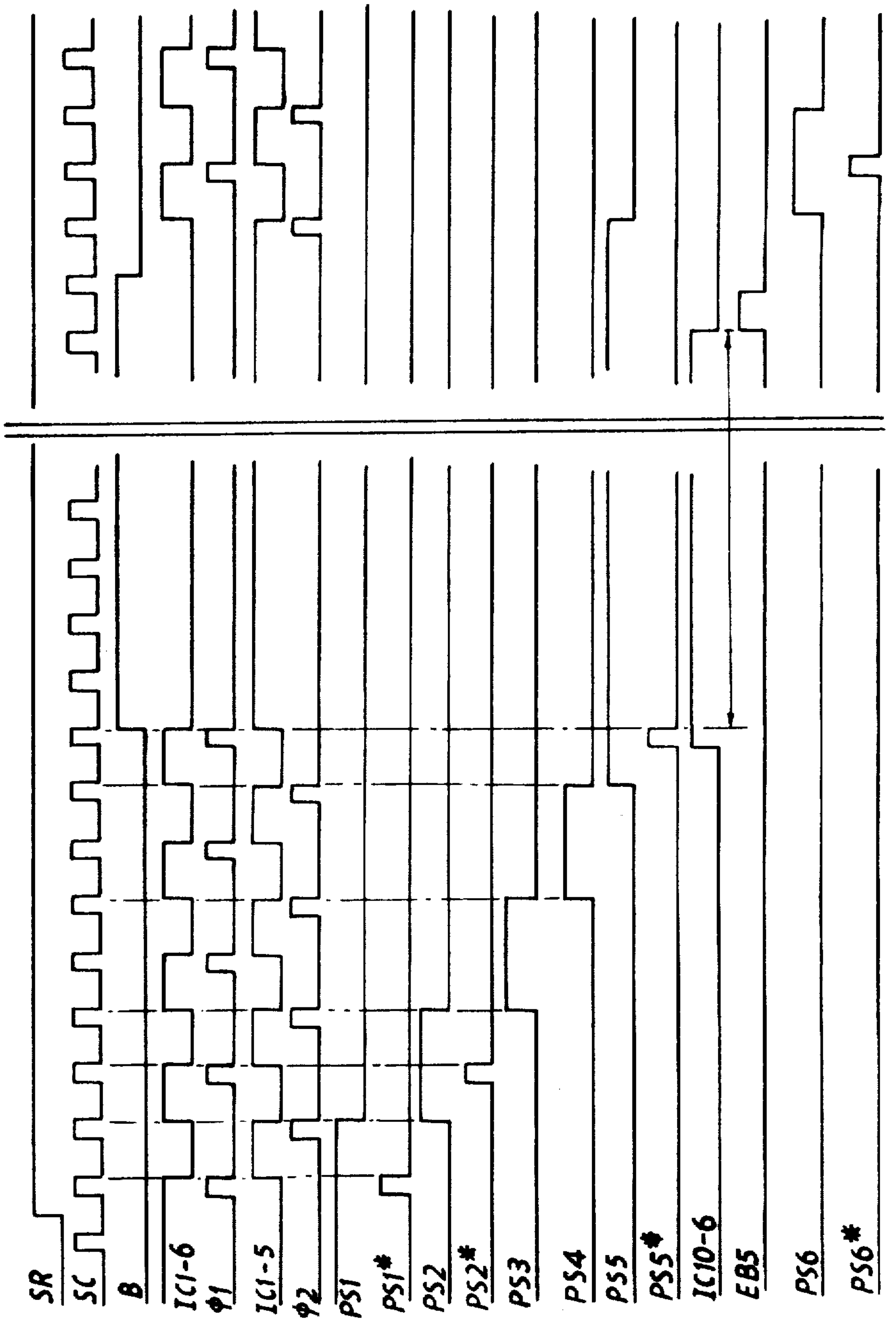
Figure 7:
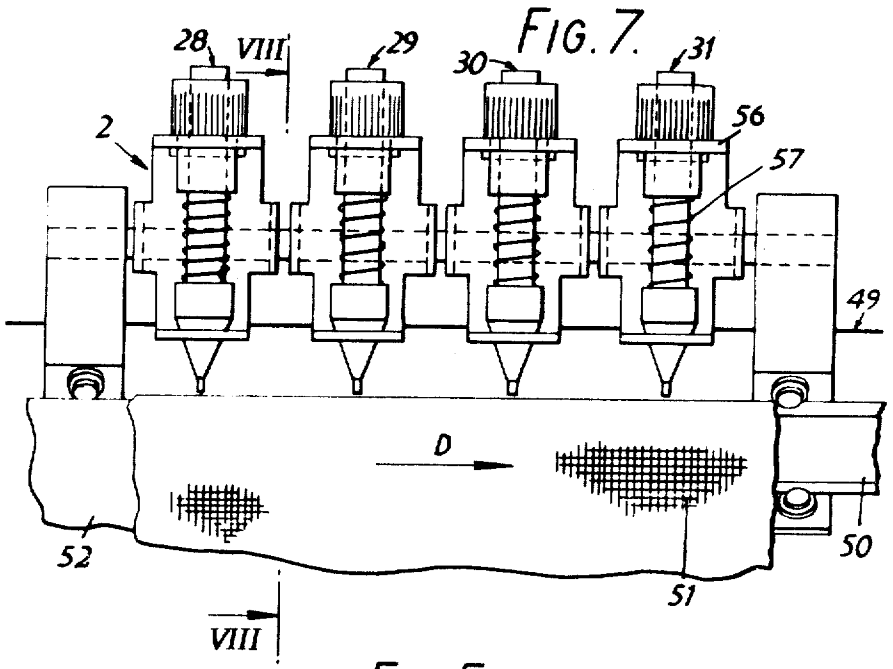
Figure 5:
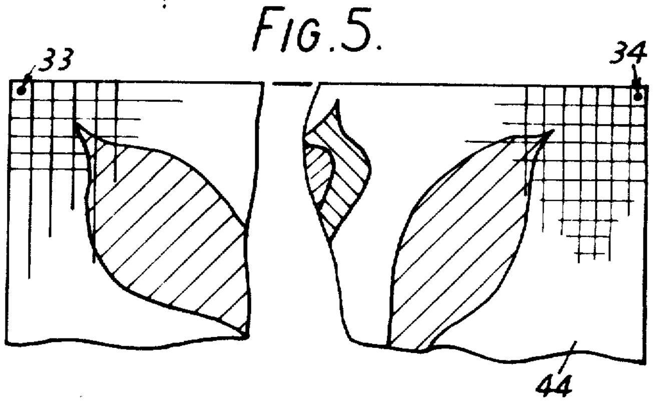
Figure 6:
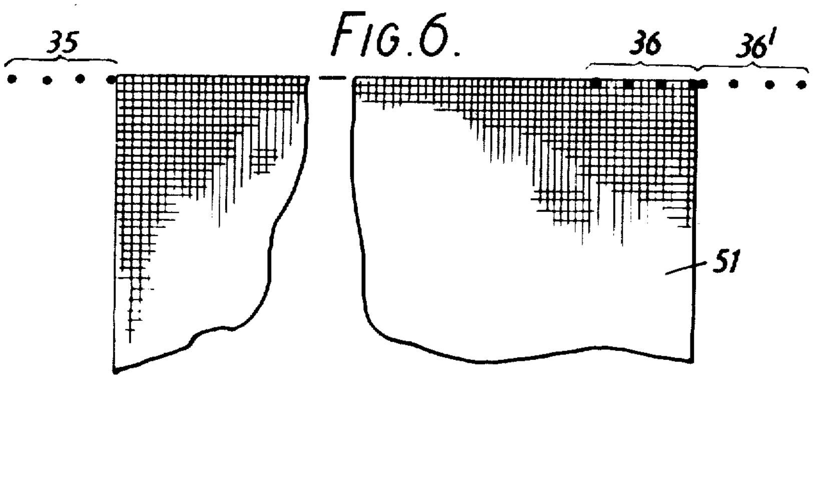
Figure 8:
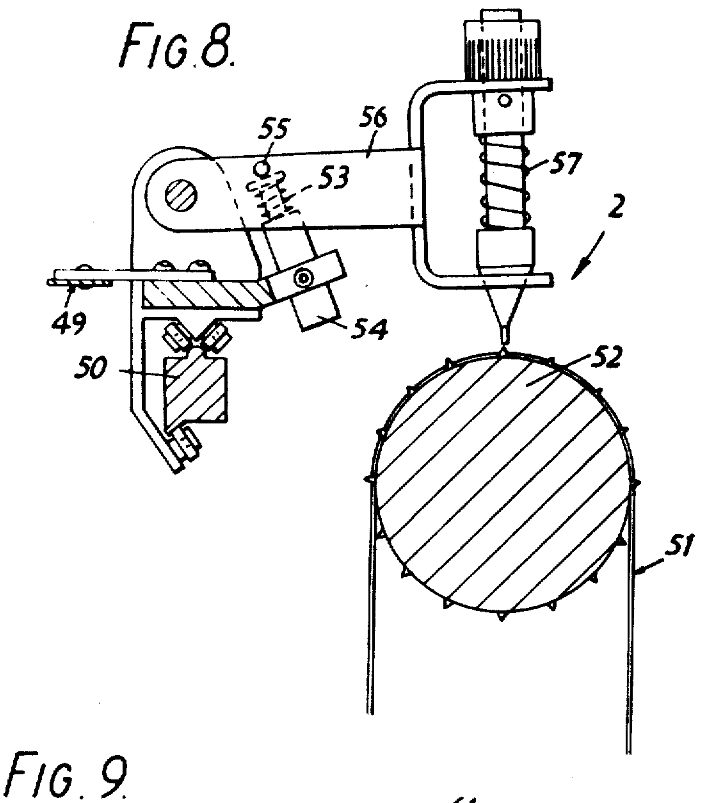
Figure 9:
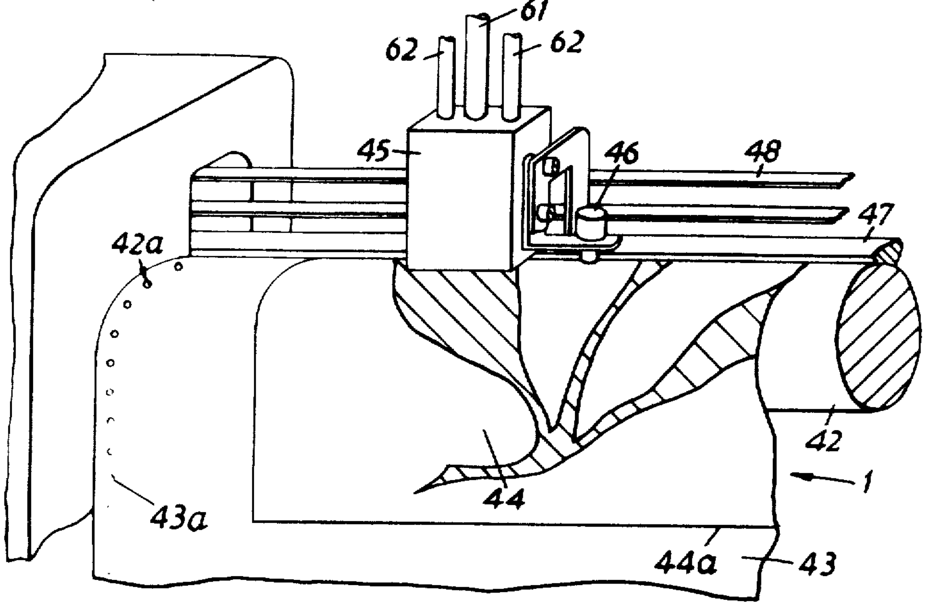
Figure 10:
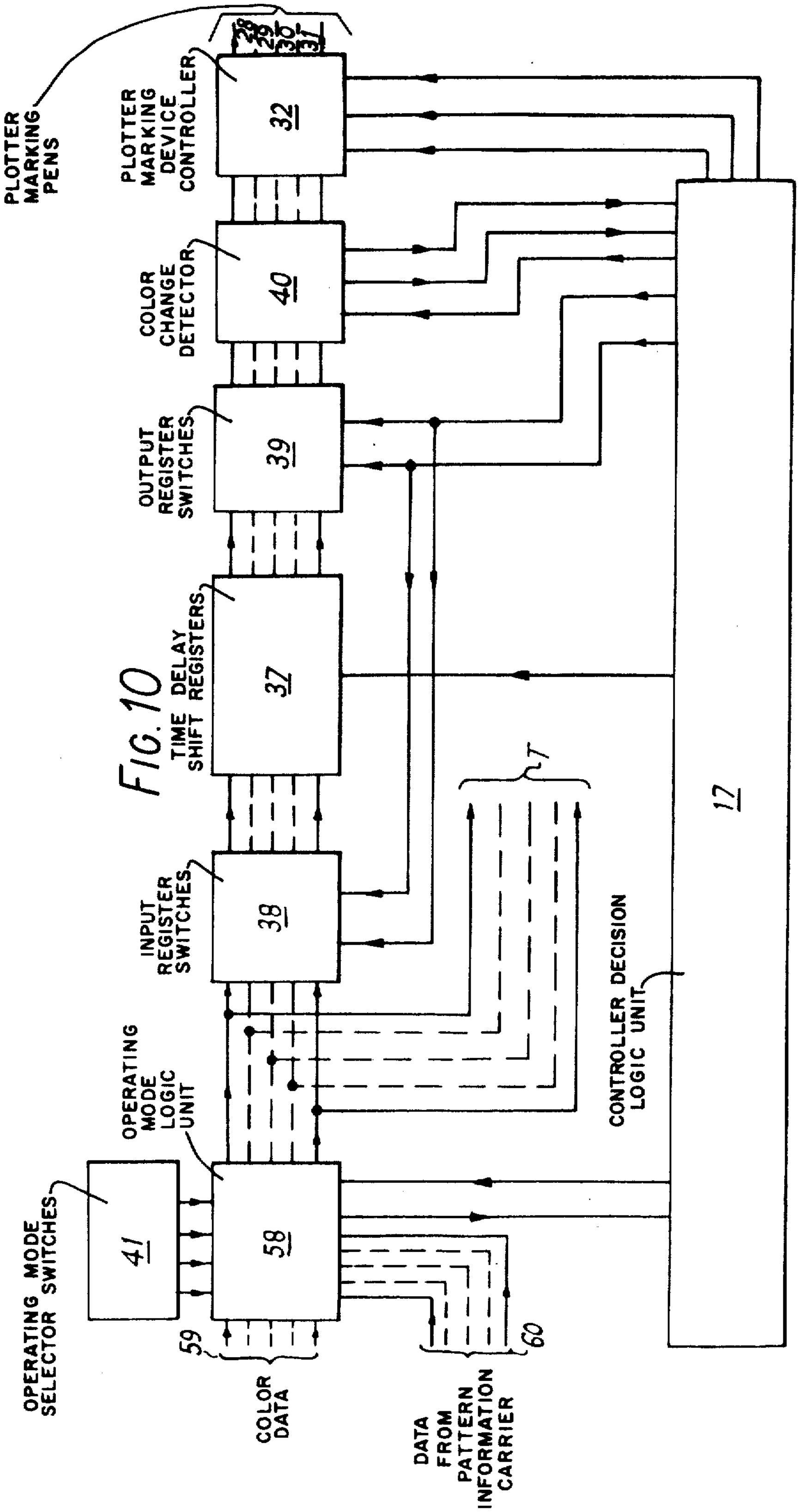

In order that the invention may be more clearly understood and readily carried into practical effect, a specific example of the squaring-off machine or apparatus provided thereby will now be described with reference to the accompanying purely diagrammatic drawings, wherein, FIG. 1 is a simple block diagram illustrative of the plot producing equipment, FIGS. 2A and 2B together constitute a more detailed block diagram of the electronic program controller included in the squaring-off machine or apparatus, FIG. 3 is a detailed circuit diagram of the two-phase clock with busy incorporated in FIG. 2A, FIG. 4 is a timing diagram showing the timing pulses generated, FIG. 5 is a fragmentary portion of an artist's picture of a typical pattern in the course of being scanned, FIG. 6 is a fragmentary portion of a squared-off plot in course of being produced, FIG. 7 is a front elevation of the incremental plotter head, FIG. 8 is a cross-section taken along the line VIII—VIII of FIG. 7, FIG. 9 is a general perspective view of the optical scanner, FIG. 10 is a block diagram of color data delay logic including tape preparation, hereinafter to be described, and FIGS. 11–14 illustrate alternative ways of arranging the illuminating light guide and the light-sampling guide or guides incorporated in the optical scanner.

Referring to FIG. 1, the illustrated automatic squaring-off machine or apparatus comprises color scanning equipment in the form of an incremental optical scanner 1 which transmits color signals to electronic hardware to provide a digital representation of the color or colors of the areas being scanned. The machine also includes plotting equipment in the form of an incremental plotter 2 which is coupled to and adapted to move and operate in sympathy with the optical scanner 1. There is also indicated in FIG. 1 an electronic program controller 3 which is a unit which accepts inputs from switches on a control panel 6 and provides outputs which effect synchronous X and Y movements of appropriate components of the scanner 1 and plotter 2 during the square-off procedure. Individual control of either the plotter or the optical scanner is, however, also possible for alternative modes of operation such as the drawing of pattern outlines, datum setting during processing information from a tape, and so on.

The color data delay logic unit indicated at 4 enables inputs and outputs from a pattern information carrier equipment 5 to be controlled—again at the dictation of the program controller 3 and the control panel 6. During such processes it is necessary to convert the parallel information as received from the scanner or tape etc., into serial form before it is presented to selectively operable marking devices of the plotter 2 which are also in serial form. The pattern information carrier equipment is usually in punched tape form but can equally well be in any equivalent form such as magnetic tape, photo-sensitive tape, information stores, e.g., core storage, magnetic drums or the like. The said pattern information carrier equipment may even be constituted by a knitting machine capable of being programmed direct from the program controller 3 when once the correct squared-off plot has been determined.

A more detailed description of the squaring-off machine or apparatus will now be given with reference to FIGS. 2A, 2B, 3, and 4.

A crystal oscillator 7, which generates the system master clock pulses designated SC in FIG. 4, is served with an automatic/manual selector switch 8, a single stitch push button 9*a* and a single program step button 9*b*. With the switch 8 set to 'automatic' a continuous train of pulses SC is enabled to enter both a two phase clock with busy unit 10 and also a time counter unit 11; this is the normal mode of operation for automatic production of a squared-off plot or rastered pattern. But with the switch 8 set to 'manual,' individual scan and plot operations of single stitches are enabled to be carried out by pushing button 9*a*. Alternatively, by pushing button 9*b*, individual selection of successive program steps, i.e. a defined number of program steps constituting the scan and plot of a single stitch, are possible.

The two phase clock with busy unit 10, upon receiving the system clock pulses SC, phase splits them into 01 and 02 in a manner hereinafter to be described with reference to FIG. 3. 02 is used to generate the sequential program steps PS1, PS2 etc., shown in FIG. 4, by use of a standard Johnson to decimal decoder integral with a program step generator 12 (see FIG. 2A). 01 is used in conjunction with the Johnson decoder in the program step generator 12 to generate the starred programme steps PS1*, PS2* etc., the relationship between these two programme steps being shown in FIG. 4.

The time duration of a programme step is governed by the interval between the pulses 02. That is to say, one 02 pulse initiates a program step and the next 02 pulse terminates it. The 01 and 02 pulses may be inhibited by raising a "busy" level as shown in the circuit illustrated in FIGS. 3 and 4. When the "busy" is raised, the system clock is still running at its known rate and by counting up these pulses on a time counter logic unit 13 (See FIG. 2A), it is possible to generate any required time interval necessary for any appropriate mechanical action. In this way the electronic system is inhibited until the completion of the scanning operations, the plotting operations and also the punch operations (in a case where pattern information carrying tapes or the like are produced).

When the time counter logic unit 13 reaches its required time count, a time finish signal is sent to end the "busy" level thus resulting in the re-generation of 01 and 02 which starts the electronic system running again and terminates the extended program step. For example, when a mechanical operation is required during programme step PS5, the pulse PS5* is injected into the integral circuit switch IC9 on input line K. In order to signal the electronic system to continue at the completion of a mechanical operation, an end of busy signal at EB 5 is fed into IC 10 as shown in FIG. 3 at the completion of the counting operation of the hereinbefore described time counter 11.

The time counter 11 together with its cooperating logic unit 13 is also the source of X and Y increment pulses for synchronously driving both the optical scanner 1 and the plotter 2. In this specific example it is assumed that the X direction of movement of the scanner and plotter is width-wise across the paper or the like, upon which the artist's impression or picture is drawn whereas the Y direction is the lengthwise movement of the scanner and plotter up and down the paper or the like. Such incrementation is controlled by stepping motors M1–M4 at the dictates of the system clock pulses from the time counter 11. These stepping motors are shown in FIG. 2A, the motors M1 and M2 respectively effecting the X and Y increments of the scanner 1, whilst the motors M3 and M4 similarly effect the X and Y increments of the plotter 2. The magnitude of the linear movement associated with each increment pulse determines the resolution of the system since the scanner head and the plotter movements per stitch will always be an integral number of increments depending on the scale factor.

A stitch unit counter 14, stitch size switches 15 and a plotter and scanner XY increment logic unit 16 control the number of increments output to the scanner and plotter such that a number of scale factors can be achieved. The scale factor or stitch size is set up by the operator on switches 15 and a continuous comparison made between this value and the current value of the stitch unit counter 14.

The program controller, indicated at 3 in FIG. 1, is in fact in part constituted by a controller decision logic unit designated 17 in each of FIGS. 2B and 10. This unit 17 receives inputs from a pattern width comparator 18, a pattern depth comparator 19, program mode selector switches 20, a control period generator 21 and an auxiliary control counter 22 together with its associated logic unit 23. As previously described it is necessary to convert the parallel information as received from the scanner or tape, etc., into serial form before it is presented to the marking devices. This entails the use of delays of shift registers (within the controller decision logic unit 17 as will be hereinafter described) which must be switched between the color data lines and the marking device drive inputs as the scanner head and marking device carriage units alternately move from left to right and vice versa. In addition, it is necessary to hold the scanner head stationary at the end of each course whilst the marking device carriage travel is completed.

Such functions are achieved by breaking down the operation of the scanner and plotter into control periods which can be any number from CP1, to, say, CP14 (see FIG. 2B) each control period being used for a particular part of the operation. In this particular example, CP1 is the period of operation during which a scanner head 45 moves from point 33 to point 34 in FIG. 5 and the marking devices of the plotter 2 move from positions 35 to positions 36 in FIG. 6. CP2 is the period of operation during which the scanner head is held at position 34 but the plotter marking devices continue to move to positions $36^1$. Then CP3 is the period of operation during which the scanner and the marking devices of the plotter move down one course. CP4 is the same as CP1 and CP5 is the same as CP2 but in respect of movements in the reverse direction, while CP6 is the control period for a movement downwards or in the X direction to the extent of one course of the scanner and plotter marking devices. The cycle of control periods is then repeated. Further control periods are selected and used for such operations as outlining the pattern area datum set procedures and, of course, control periods can be missed out in order to scan and plot in one direction only. The necessary information to enable such actions to be taken is fed into the controller decision logic unit 17 prior to operating the machine. Cycling of the control periods is under the control of the aforementioned control period generator 21, which again operates in conjunction with a Johnson Counter.

Control period CP1 is pre-set in the unit 17 to be in the positive direction for both the scanner and the plotter and to be of a number of increments equal to the pattern width information from the pattern width comparator 18, the incrementation information being sent to the scanner and the plotter for the required time.

Control period CP2 covers a known number of increments of the plotter 2 which are counted by the auxiliary control counter 22. Similarly, the correct information is sent to the scanner and the plotter from the controller decision logic unit 17 for other control periods which have been pre-selected into the program.

The pattern width comparator 18 is pre-fed manually with the pattern width information by width switches 24 which it compares with a pattern width counter 25 in order to signal the decision unit 17 that the required pattern width has been scanned or plotted as required. Similarly, the pattern depth comparator 19 is pre-fed with the pattern depth information from switches 26 which it compares with a pattern depth counter 27.

The information regarding the color being scanned is passed from the scanner head 45 (incorporated in the scanner) to the controller decision logic unit 17 so that any necessary change in color is recorded and hence selection of the relevant marking device to produce the change is effected. Before any marking device change can be made, a signal is sent from a color change detector 40 (see FIG. 10) cooperating with the scanner head 45 via the controller decision logic unit 17 to the busy unit 10 (FIG. 2A). The color change information is thereupon passed to a plotter marking device driver 32 which includes the necessary logic to control from the scanner head 45 solenoids such as 54 (FIG. 8) but such information must naturally be sent at the right time. This time is a consideration of the physical displacement of all the marking devices of the plotter in that as they move across the plotting area the said devices reach respective particular points at respectively different times; all the marking devices other than the first of the series must therefore be delayed appropriate amounts of time compared to the first device. Let it now be assumed that the marking devices consist of pens and that the plotter is equipped with four pens, viz, a black pen 28, a white pen 29, a green pen 30, and a red pen 31. In order that suitable delays may be obtained, there is incorporated in the machine a series of shift registers 37 which are selected by input and output register switches 38 and 39 respectively. These switches operate in such a way that if Red information is required to be passed to the red pen 31, when the plotter is traveling in the direction of the arrow D in FIG. 7, the signal is not delayed. Green information is routed to the green pen 30 through a shift register causing a delay of one period, White information is routed to the white pen 29 through a shift register causing a delay of two periods, and Black information is routed to the black pen 28 through a shift register causing a delay of three periods. When producing a return direction plot, then the Red information is routed through a three period delay shift register, the Green information through a two period delay, the White information through a one period delay and the Black is not delayed because the pen which was first is now last, and vice versa. To make the appropriate switching the input and output register switches 38 and 39 are fed with gating signals depending in which direction the plotting is taking place.

Manifestly, although the number of marking pens in the drawings is four, there is no limitation in this respect as the number may vary according to the number of colors to be scanned.

The mechanical make-up of the optical scanner in the particular example now being described is illustrated in FIG. 9. As will be seen, a drum 42 of a comparatively small diameter and about 30 inches long is mounted for incremental rotational movement under the influence of the controller decision logic unit 17. Over this drum is passed paper 43 with an artist's impression or picture 44 on it. Each of the opposite margins of the paper 43 has equally spaced holes **43*a* formed therein for meshing with circular series of projections 42*a* provided at opposite ends of the drum 42. The drum 42 is rotatable incrementally in both directions to move the paper 43 forwardly or backwardly relatively to the scanner head 45 in the direction of the Y axis of the picture 44**.

The artist draws a line **44*a* at a certain position along the top of the picture 44, this line thereupon being brought to the top of drum 42. The scanner head 45, which is of a form disclosed in United Kingdom Patent Application No. 45466/69 aforesaid has attached to it a glass 46 with cross wire markings on it. The cross wires are aligned with the line 44*a* drawn at the top of the picture 44, and the machine is switched on. As a consequence, the scanner head 45** will be automatically aligned with its first point of scan.

The scanner head 45 is slidably mounted on a rail 47 and is attached to a flexible band 48 which is incrementally movable across the drum 42, i.e., along the X-axis, under the control of the controller decision logic unit 17.

As previously mentioned, in their preferred form the tone or color differentiating means embodied in the scanner head 45 consist of fiber-optic light guides. Accordingly, the incremental scanner 1 advantageously consists of an optical scanning apparatus comprising an optic-fiber scanner head 45 carrying one end of a flexible illuminating light guide 61 and one end of at least one flexible sampling light guide the other end of the illuminating light guide being separate from the other end of the or each sampling light guide, and mechanical means supporting the said fiber-optic scanner head 45 and arranged to cause the latter to scan successive points of an artist's impression or picture such as 44 so that when light is directed on to the said impression or picture through the illuminating light guide, the or each sampling light guide samples the light reflected from each successive illuminated point.

Preferably the light-responsive means are mounted at the other end of the or each sampling light guide and are effective to produce electrical signals representative of the light reflected from the successively illuminated points of the pattern. Said light-responsive means may comprise at least one photo-electric element adapted to provide the electrical signals.

Light-transmitting fibers have the advantage of flexibility, of enabling light to be transmitted along any path defined by the fibers, and of being immune to external electrical noise sources. Consequently, in the present invention, the light source for illuminating the pattern, through the illuminating light guide, and the photoresponsive means for receiving the light sampled from the or each light sampling guide can be located in a fixed position remote from the artist's impression or picture 44 being scanned. On account of the flexibility of the light-transmitting fibers, the scanner head has freedom to effect scanning movement independently of the associated electronic equipment which may be relatively bulky. Since the light-transmitting fibers are in general of low weight, the scanner head 45 can therefore rapidly and accurately scan a pattern without difficulty.

Figure 11:
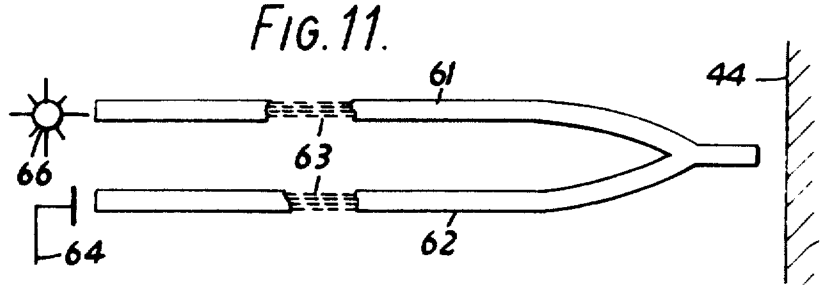
Figure 13:
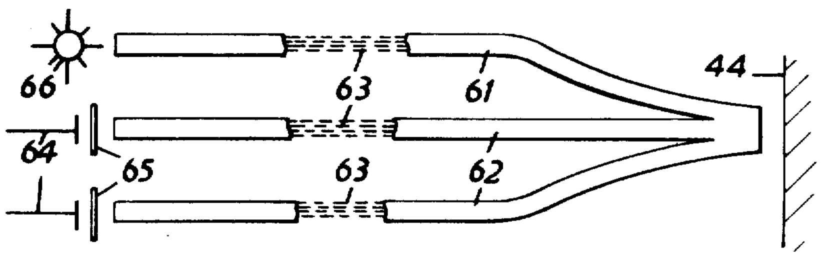

In each of the examples shown in FIGS. 11 and 13, the or each sampling light guide 62 merges at the scanner head 45 with the illuminating light guide 61, the light-transmitting fibers 63 of the or each sampling light guide being interspersed at the said head with those of the illuminating light guide.

Figure 12:
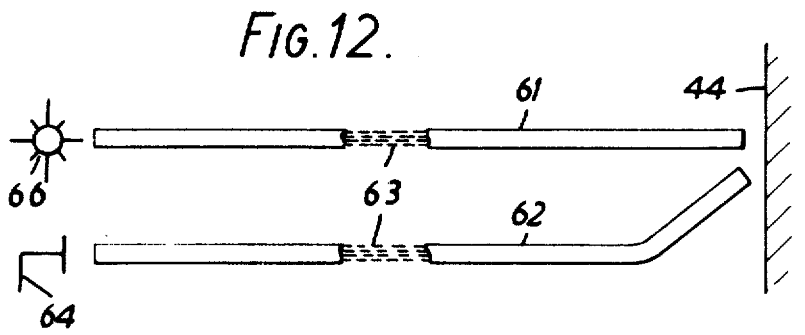
Figure 14:
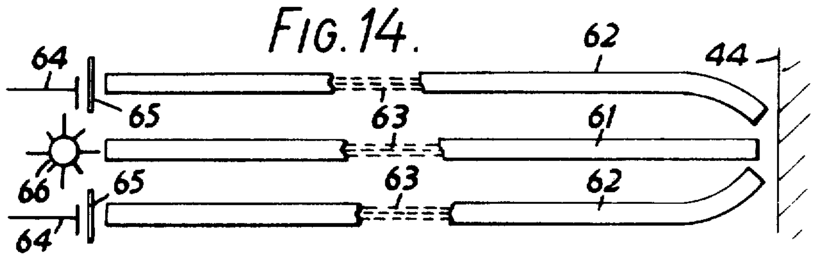

Alternatively, and as shown in FIGS. 12 and 14, the illuminating and light sampling guides 61 and 62 are separate from each other, the relevant ends of said guides being held in the scanner head 45 in fixed relative positions in juxtaposition to each other. Preferably, the or each sampling light guide 62 is so positioned that it receives light diffusively reflected from an illuminated point of an artist's impression or picture.

The optical scanning apparatus may be employed with a single light-sampling guide 62 when it is desired to encode a black-and-white pattern (see FIGS. 11 and 12). As previously described, however, the invention is also readily applicable to the encoding of colored patterns. This may, for example, be effected by providing a single light-sampling guide including at least one dichroic splitter for splitting the light transmitted through this guide into two or more component beams of different colors. Preferably, however, at least two light-sampling guides 62 are provided, each being arranged to conduct sampled light to a different light-responsive element 64, and a respective color filter 65 being incorporated in each sampling light guide 62, or interposed between the relevant light-responsive element and the adjacent end of the respective sampling light guide, so that said light-responsive elements provide signals representative of different color components in the sampled light. The light-responsive elements 64, which are preferably photo-electric detectors, may be such that the presence or absence of light of the appropriate color in the light sampled from the illuminated point of the artist's impression or picture of a pattern is indicated by the presence or absence of an electrical signal from the element concerned. Where more than one photo-responsive element 64 is provided, the electrical signals from the different elements would be stored as digital coded information representative of the colors in the light sampled from the successively illuminated areas of the scanned pattern.

A light source 66 is provided at the end of the illuminating light guide 61 remote from the artist's impression or picture 44 to be scanned.

In any event the drum 42 supports the artist's impression or picture in juxtaposition to the fiber-optic scanner head 45. The first motor M1 (FIG. 2A) displaces the drum 42 rotationally to move 44 along the X-axis and the second motor M2 displaces the scanner head 45 relatively to the said drum linearly along the Y-axis, the two scanner motors being controlled automatically as hereinbefore described.

It is principally the intention that the scanner head 45 shall scan the artist's impression or picture 44 in raster fashion televisionwise but in a series of discrete movements—each such movement being so made that the fiber-optic probe 61 of the scanner head 45 is placed in an appropriate position to detect tone or color at the relevant point on the artist's impression or picture and to pass the information to the incremental plotter 2 either direct, or more usually, through the hereinbefore mentioned electronic store.

The mechanical make-up of the incremental plotter 2 is shown in FIGS. 7 and 8 and is in essential respects similar to that described with respect to the incremental scanner 1 illustrated in FIG. 9. The only difference is that in the place of the scanner head 45 there is provided in the plotter 2 the series of solenoid-operated pens 28, 29, 30, and 31 attached to a flexible band 49 and slidably mounted on a rail 50. Each of the said pens is normally held by a spring 53 (see FIG. 8) just clear of squared paper 51 on a roller 52. The springs 53 extend spirally around the armatures of solenoids 54. These armatures are normally held out by the springs 53 so that they each push on a rod 55 which is fixed on to a pen carrier bracket 56. It is in this way that the pens are normally held clear of the paper. Upon receipt of a signal from the plotter pen driver 32, the relevant one of the solenoids 54 is energized and the respective pen allowed to contact the paper 51. The pens are freely held in their carrier brackets 56 by springs 57 which allow the said brackets to drop to such an extent as to ensure contact between pen and paper.

The incremental plotter 2, similar to that used on an electronic computer, is operable by mechanical driving means and functions in a manner similar to, i.e., in sympathy with, the incremental scanner 1. Thus, the selectively operable pens 28, 29, 30, and 31 are mounted in a straight row in carriage means which are traversible back and forth in steps along a Y-axis, by means of the stepping motor M4 (see FIG. 2A) whereas the squared paper 51 which is to be marked to produce a squared-off plot is movable stepwise along the X-axis by virtue of incremental rotation of the supporting roller 52 effected by the motor M3.

The upper limits of pattern width and depth are determined solely by the physical size of the scanner and plotter in conjunction with the scale of the plot. For example, 1 mm squares would normally be used as the grid or resolution size of the artist's impression or picture, but as previously implied the plot can be of any desired grid or resolution size compatible with the physical size of the plotter.

Editing of a rastered pattern can be carried out in a case where it is not acceptable by the designer. In this instance, a counting unit is connected to the plotting head and the coordinates of any stitch point requiring changing are logged. The squaring-off machine is then started up on 'automatic' and continues until the position of the first set of coordinates is reached at which stage the machine stops and the color of this point of the pattern is put in manually. The machine is then restarted and continues to the position of the next set of coordinates, and so on.

After completion of the editing procedure, the automatic squaring-off machine of this invention may be connected up to a suitable puncher, series of punches or other storage control means so as to enable a pattern information carrier for controlling a knitting or other textile machine to be produced from the artist's impression or picture via an edited squared-off plot. The punching of a pattern information carrier, such as a paper tape or a magnetic tape, may be effected in a similar way to a typing operation on a special machine.

When once a tape or other form of pattern information carrier has been produced it is also possible to produce a rastered pattern from the tape etc. In this way a tape or other pattern information carrier can be checked. It is only necessary to select the appropriate one of the operating mode selector switches 41 (see FIG. 10) to select the appropriate logic through an operating mode logic unit 58. Accordingly, it is not necessarily color data 59 that is fed to the input register switch 38 as it could equally well be data input 60 from tape reader heads.

Referring again to FIG. 2A, it is to be understood that the signals producing PS1, PSI* . . . PS10, PS10* are all fed to the controller decision logic unit 17.

In FIGS. 3 and 4, whilst SC refers to 'system clock,' SR refers to 'system run.' The line marked B in each of these two figures as well as in FIG. 2A is concerned with a 'busy' signal.

At the bottom of FIG. 4, the horizontal line with oppositely pointing arrow heads at its respectively opposite ends refers to a 'time counter' counting up SC pulses.

In FIG. 10, the leads bracketed at T carry signals to a tape punch or magnetic tape heads.

Although, in the specific example illustrated in the drawings, the artist's impression or picture is drawn upon paper 44, which is literally squared, and the plot is made on paper 51 which is actually marked with a grid of squares, to facilitate a clearer understanding of the theoretical considerations involved, it is to be clearly understood that, in practice, neither the paper 44 nor the paper 51 need actually be so marked: plain paper may be used in which instance the grids of squares are purely imaginary ones.

We claim:

1. A machine for automatically producing squared-off plots from which to prepare pattern information carriers for controlling machines comprising, in combination, an incremental scanner incorporating tone or color differentiating means and including means for scanning points of an artist's picture of a desired pattern and for producing signals appropriate to each of said points, an incremental plotter, an electronic programme controller which is connected both to the scanner and to the plotter and includes means for programming movements thereof, wherein said plotter is furnished with a plurality of selectively operable marking devices each for marking on a plot a bit of information appropriate to one of said signals, and the program controller includes sequence timing means for causing movements of the scanner at predetermined intervals of time; control means for controlling movements of the plotter; selecting means for selecting a marking device corresponding to a point scanned by the scanner thereby to position the said marking device in the appropriate position in relation to the plot; and feedback means for halting the movements of the scanner while a selected marking device is being selected and operated, the program controller thus controlling movements of the scanner and the plotter in such a way that successively scanned points of an artist's picture are plotted by selected marking devices as bits on the plot corresponding to the aforesaid scanned points.

2. A machine as claimed in claim 1, wherein the selectively operable marking devices of the plotter are separately mounted serially with their axes spaced apart at relatively fixed locations on traversible carriage means, the machine including means for traversing the carriage means to positions in which selected marking devices can mark relevant portions of a plot, and an electronic store incorporating color data delay logic being arranged between the tone or color differentiating means and the said carriage means to receive and store information passed to it by the differentiating means so that such information can be used for plotting with the appropriate marking devices at the relevant times.

3. A machine as claimed in claim 2, wherein the selectively operable marking devices are shiftable axially relatively to the carriage means, at the dictates of the electronic store, to enable them to mark plot paper supported in the plotter.

4. A machine according to claim 1, which is provided with manual overide means actuation of which permit editing of a squared-off plot to be carried out in a case where an artist requires a different interpretation to an edge of a pattern from that decided by the machine when functioning automatically.

5. A machine according to claim 2, wherein the color data delay logic means are linked with pattern information carrier equipment whereby inputs and outputs from the said equipment can be controlled at the dictation of the program controller.

6. A machine according to claim 1, wherein the program controller includes a decision logic unit which accepts inputs from control switches and provides outputs which effect, via a time counter and a logic unit cooperable therewith, synchronous X and Y movements of appropriate components of the scanner and the plotter.

7. A machine according to claim 1, wherein the tone or color differentiating means arranged on the scanner to successively scan points of an artist's picture include fiber-optic light guides.

8. A machine according to claim 7, wherein an incrementally movable scanner head carries a flexible illuminating light guide through which light is directed on to the successively scanned points of the artist's picture, and at least one flexible sampling light guide adapted to sample light reflected from the illuminated points and to transmit the same to light-responsive means by which signals constituting information representative of the scanned picture are produced.

9. A machine according to claim 8, wherein the scanner head carries at least two sampling light guides each arranged to conduct sampled light to a different light-responsive element, and a respective color filter is interposed between the relevant light-responsive element and the adjacent end of the respective sampling light guide so that the light-responsive elements provide signals representative of different color components in the sampled light.

10. A machine according to claim 6, wherein the scanner head is slidably mounted on a guide member and attached to a driver element which is movable incrementally along an X-axis under the control of the decision logic unit incorporated in the program controller, and an incrementally rotatable drum, also influenced by the decision logic unit, is provided to support paper or the like bearing an artist's picture and thus to move the latter along a Y-axis forwardly or backwardly relatively to the scanner head.

11. A machine according to claim 10, wherein the selectively operable marking devices of the plotter consist of a row of solenoid-operated pens the carriage means for which are slidably mounted on a guide member and attached to a driver element which is movable incrementally along an X-axis, under the control of the decision logic unit, and the plotter includes an incrementally rotatable drum which supports paper or the like upon which the pens mark the squared-off plot and thus moves the said paper or the like along a Y-axis under the control of the decision logic unit, forwardly or backwardly relative to the pen carriage means.

12. A machine according to claim 1, wherein a decision logic unit incorporated in the program controller receives inputs from a pattern width comparator, a pattern depth comparator, program mode selector switches, a control period generator and an auxiliary control counter, the pattern width and depth comparators being pre-fed manually with pattern width and pattern depth information by pattern width and pattern depth switches respectively, and the said width and depth information being compared by the comparators with pattern width and pattern depth counters in order to signal the decision logic unit that the required pattern width and depth have been scanned and plotted as required.

A machine according to claim 10, wherein color information is passed from the scanner head to the decision logic unit, and to initiate marking device changes signals are sent from a color change detector cooperable with the scanner head to a busy unit via the decision logic unit, the color change information being thereupon passed at the appropriate time to a marking device driver which includes the necessary logic to control operation of the selected marking devices through the medium of solenoids.

14. A machine according to claim 13, wherein shift registers combined with the decision logic unit are selectable by input and output register switches which are connected with said unit and are operable in such a way that a signal from the color change detector is either not delayed or is routed through a shift register to produce a delay of the appropriate period, depending on the position of the selected marking device in the plotter.

15. A machine according to claim 6, wherein there are associated with the decision logic unit a generator for producing system master clock pulses, and an automatic/manual selector switch, a single stitch switch and a single programme switch are provided to serve the said generator, whereby with the selector switch set to 'automatic,' a continuous train of pulses enter both a two phase clock with busy unit and also the time counter, whereas with the selector switch set to 'manual' individual scan and plot operations of single stitches are enabled to be carried out by closing the single stitch switch or individual selection of successive program steps can be effected by closing the single program switch.

* * * * *